(12) United States Patent
Mayer et al.

(10) Patent No.: US 11,873,870 B2
(45) Date of Patent: Jan. 16, 2024

(54) METHOD FOR CONTROLLING A FRICTION CLUTCH, AND TORQUE TRANSMISSION DEVICE COMPRISING SAME

(71) Applicant: Schaeffler Technologies AG & Co. KG, Herzogenaurach (DE)

(72) Inventors: Carsten Mayer, Lohr a. Main (DE); Marco Grethei, Bühlertal (DE); Yunfan Wei, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/762,120

(22) PCT Filed: Aug. 26, 2020

(86) PCT No.: PCT/DE2020/100754
§ 371 (c)(1),
(2) Date: Mar. 21, 2022

(87) PCT Pub. No.: WO2021/058053
PCT Pub. Date: Apr. 1, 2021

(65) Prior Publication Data
US 2022/0373042 A1 Nov. 24, 2022

(30) Foreign Application Priority Data
Sep. 27, 2019 (DE) ............... 10 2019 126 191.0

(51) Int. Cl.
*F16D 48/06* (2006.01)
*F16D 48/02* (2006.01)

(52) U.S. Cl.
CPC ....... *F16D 48/066* (2013.01); *F16D 48/0206* (2013.01); *F16D 2048/0221* (2013.01);
(Continued)

(58) Field of Classification Search
CPC .... F16D 48/066; F16D 48/02; F16D 48/0206; F16D 2048/0221; F16D 2048/0245;
(Continued)

(56) References Cited

U.S. PATENT DOCUMENTS

| | | | |
|---|---|---|---|
| 2003/0075412 A1 | 4/2003 | Heiartz | |
| 2009/0139827 A1* | 6/2009 | Homm | F16D 48/02 192/85.01 |

(Continued)

FOREIGN PATENT DOCUMENTS

| | | |
|---|---|---|
| CN | 105090134 A | 11/2015 |
| CN | 110167780 A | 8/2019 |

(Continued)

OTHER PUBLICATIONS

EP2933519 translation (Year: 2013).*

*Primary Examiner* — Timothy Hannon

(57) ABSTRACT

A method for controlling a friction clutch actuated by an actuation system using an actuation pressure ambiguously applied along an actuation path includes providing the friction clutch and the actuation system, detecting a time curve of an actuation processes of the friction clutch, and comparing the time curve with the actuation pressure to ascertain an unambiguous friction clutch actuation path. The method may also include using the time curve to determine whether the friction clutch is in an opening state or a closing state and whether the actuation pressure is applied to an opened friction clutch actuation path or a closed friction clutch actuation path, and starting from a set actuation pressure, carrying out a directional control of the friction clutch by specifying the actuation pressure.

16 Claims, 2 Drawing Sheets

(52) U.S. Cl.
CPC ............. *F16D 2048/0266* (2013.01); *F16D 2048/0269* (2013.01); *F16D 2500/1026* (2013.01)

(58) Field of Classification Search
CPC ..... F16D 2048/0266; F16D 2048/0269; F16D 2500/1026; F16D 2500/1027; F16D 2500/1083; F16D 2500/3024; F16D 2500/3026; F16D 2500/50236; F16D 2500/5016

See application file for complete search history.

(56) References Cited

U.S. PATENT DOCUMENTS

| | | | |
|---|---|---|---|
| 2017/0146075 A1 | 5/2017 | Lister | |
| 2018/0003248 A1* | 1/2018 | Herkommer | F15B 11/165 |
| 2021/0018052 A1* | 1/2021 | Eberle | F16D 48/06 |

FOREIGN PATENT DOCUMENTS

| | | | | |
|---|---|---|---|---|
| DE | 1286349 B | 1/1969 | | |
| DE | 10138395 A1 | 2/2003 | | |
| DE | 102005006431 A1 | 8/2006 | | |
| DE | 102006042393 A1 | 3/2008 | | |
| DE | 102008033041 A1 | 2/2009 | | |
| DE | 102008059233 A1 | 6/2009 | | |
| DE | 102012218255 A1 | 5/2013 | | |
| DE | 102012220178 A1 | 8/2013 | | |
| DE | 102013206454 A1 | 11/2013 | | |
| DE | 102013208986 A1 | 12/2013 | | |
| DE | 102014226548 A1 | 6/2016 | | |
| DE | 102015216564 A1 | 3/2017 | | |
| DE | 102016202414 A1 | 8/2017 | | |
| DE | 102018106589 A1 | 11/2018 | | |
| DE | 102019109977 A1 | 11/2019 | | |
| DE | 102019126188 A1 | 4/2021 | | |
| EP | 1750026 A1 | 2/2007 | | |
| EP | 2620311 A1 | 7/2013 | | |
| EP | 2933519 A2 * | 10/2015 | ............ | F16D 48/02 |
| EP | 3099955 B1 | 10/2017 | | |
| EP | 3364064 A1 | 10/2017 | | |
| WO | 2006136140 A1 | 12/2006 | | |
| WO | 2011085862 A1 | 7/2011 | | |
| WO | 2015165456 A1 | 11/2015 | | |
| WO | 2019201375 A1 | 10/2019 | | |

* cited by examiner

METHOD FOR CONTROLLING A FRICTION CLUTCH, AND TORQUE TRANSMISSION DEVICE COMPRISING SAME

CROSS-REFERENCE TO RELATED APPLICATIONS

This application is the United States National Phase of PCT Appln. No. PCT/DE2020/100754 filed Aug. 26, 2020, which claims priority to German Application No. DE102019126191.0 filed Sep. 27, 2019, the entire disclosures of which are incorporated by reference herein.

TECHNICAL FIELD

The present disclosure relates to a method for controlling a friction clutch, which is automatically actuated by an actuation system by means of an actuation pressure applied along an actuation path and which has an ambiguous assignment of the actuation pressure to the actuation path, and to a torque transmission device having the same.

BACKGROUND

Friction clutches are known in motor vehicle drive trains for transmitting torque and compensating for speed differences between a crankshaft of an internal combustion engine and a transmission input shaft of a transmission. In the closed state of the friction clutch, a pressure plate is prestressed against a counter-pressure plate by means of a disc spring in the case of so-called normally closed friction clutches, wherein friction linings of a clutch disc are clamped between the counter-pressure plate and the pressure plate. The friction clutch is disengaged by reducing the contact pressure of the plate spring by means of an actuation system, for example a pressure cylinder along an axial actuation path, so that the pressure plate lifts off the counter-pressure plate and the frictional engagement with the friction linings is gradually eliminated. The characteristic curve of the contact pressure of a plate spring against the actuation path is not linear and has a maximum force, so that in the case of an automatically actuated friction clutch there can be two actuation paths for a given contact force, and thus, for example, in actuation systems with a control of the actuation path by means of a predetermined actuation pressure, a clear control of the friction clutch is not possible.

From the publication DE 10 2008 059 233 A1, it is known, in an automated actuation of a friction clutch by means of a slave cylinder and a pressure supply device, to adjust the pressure at the slave cylinder by means of a pressure control valve. For the compensation of ambiguous pressure/displacement characteristic curves an additional sensor cylinder coupled to the actuation path is proposed which has a linear pressure/displacement ratio and the pressure of which is used as a correction variable for the pressure control valve.

SUMMARY

The present disclosure provides a method for controlling a friction clutch and a torque transmission device containing this friction clutch. The mechanical complexity is kept low for producing an unambiguous assignment of the actuation pressure to an actuation path for actuating a normally closed friction clutch.

The proposed method is used to control a friction clutch that is automatically actuated by means of an actuation system by means of an actuation pressure applied along an actuation path. The friction clutch may be designed as a normally closed friction clutch which forms a frictional engagement when the actuation system is not effective. The action of an actuating component of the actuation system, for example an actuation piston acted upon by an actuation pressure from a pressure supply device, cancels out a prestressing that has been set, for example by means of a disc spring.

The friction clutch can be designed as a dry clutch, in which a pressure plate is prestressed, for example by means of a plate spring, against an axially fixed counter-pressure plate with the clamping of friction linings. Alternatively, the friction clutch can be designed as a wet clutch in which the input-side and output-side discs are arranged in an axially layered manner and are prestressed axially by a prestressing spring such as a plate spring against an axially fixed end disc. Due to the way in which the frictional engagement is formed by means of axial prestressing, an assignment of the actuation pressure to the actuation path is not unambiguous since, for example, two actuation paths can be assigned to one value of an actuation pressure.

To establish an unambiguousness of the actuation pressure for a single actuation path, it is proposed to record a time profile of actuation processes of the friction clutch and to compare it with the actuation pressure. This means, for example, the direction from which, or the gradient at which, the friction clutch is actuated is used to determine at which of the ambiguous path points the friction clutch, or the actuation piston actuating it, is located along a predetermined actuation path, or another component of the friction clutch and/or the actuation system is located at a predetermined actuation pressure. If this actuation path point is clearly determined, the actuation path can be determined from this over the further course and, depending on the actuation pressure, a path control can be carried out at least during an opening or closing process of the friction clutch by correspondingly applying a corresponding actuation pressure to the actuation piston.

According to the proposed method, it can be determined whether the friction clutch is in the opening or closing state on the basis of the progression over time. Based on this information, the applied actuation pressure can be assigned to an actuation path of the opened or the closed friction clutch. A path control can then be carried out by means of a correspondingly predetermined actuation pressure.

According to an example embodiment of the proposed method, an electrically actuated directional control valve is arranged between a pressure supply device and the friction clutch. The directional control valve may have a first position with a connection between the friction clutch and the pressure supply device for an opening friction clutch, a second position with a connection between the friction clutch and an unpressurized reservoir for a closing friction clutch, and a third position with the directional control valve closed relative to the friction clutch. An unambiguous actuation path is assigned to the actuation pressure as a function of the position of the directional control valve.

By means of such a control valve, for example, the friction clutch can be opened and closed and kept in an open state. For example, in an open state in the third position of the directional control valve, closing of the friction clutch due to leakage with decreasing actuation pressure can be readjusted by switching to the first position. Here, based on the history of the valve switching of the directional control valve, it is possible to clearly allocate the actuation pressure to the corresponding path point of the actuation path.

Depending on the desired behavior of the friction clutch, the directional control valve can be set to the second position in a de-energized state and the directional control valve can be de-energized if there is a fault in the actuation system. As a result; the friction clutch is closed in the event of a fault in the actuation system, so that a limp-home function is possible. This may be useful in hybrid drive trains, in which it is possible to start from zero speed by means of an electric machine.

For example, in a torque transmission device with two partial transmission arranged in parallel and driven by at least one electric machine, with friction clutches arranged between the electric machine and the respective partial transmissions, one of the friction clutches can be designed to be normally open, and the others to be normally closed. In the event of a failure of the actuation system for actuating the friction clutches, the friction clutches may be each operated de-energized. As a result, in the event of a fault in the actuation system, one of the friction clutches is closed and the other is open. In the case of partial transmissions each with a single transmission ratio, the normally closed friction clutch can be assigned the long transmission ratio.

The present disclosure also provides a torque transmission device for the controlled transmission from a drive unit formed from an internal combustion engine and/or at least one electric machine to a transmission. The torque transmission device serves, for example, to carry out the proposed method. The torque transmission device may be provided for an electric and/or a hybrid drive train and contains at least one friction clutch actuated by a hydraulic actuation system with an ambiguous assignment of the actuation pressure provided by a pressure supply device of the actuation system along its actuation path. A pressure sensor is provided to determine the actuation pressure applied to the friction clutch. A routine for processing is provided in a control unit of the actuation system to determine an actuation path that can be clearly assigned to the actuation pressure, according to the proposed method.

The friction clutch may be designed as a friction clutch that is closed in the unpressurized state and is operated dry or wet.

One embodiment of the torque transmission device can be designed in such a way that an electrically actuated directional control valve is arranged between the pressure supply device and the friction clutch. The directional control valve has a first position with a connection between the friction clutch and the pressure supply device with an opening friction clutch, a second position with a connection between the friction clutch and an unpressurized reservoir with a closing friction clutch, and a third position with the directional control valve closed relative to the friction clutch.

The normally closed friction clutch can be assigned an additional, second friction clutch, which is open in the unpressurized state and which is controlled by the actuation system by means of an unambiguous assignment along its actuation path of an actuation pressure that controls it. The friction clutches may form a wet or dry double clutch and may be effectively arranged between the drive unit and a transmission input shaft of a partial transmission with a fixed ratio of the transmission.

One or both friction clutches of the proposed torque transmission device can be acted upon axially along their actuation path by means of piston-cylinder units rotating around an axis of rotation of the friction clutches. Rotary feedthroughs may be provided between the pressure supply device arranged fixed to the housing and the corresponding piston-cylinder units.

The proposed method for controlling or regulating a normally closed (normally closed) friction clutch and the associated torque transmission device with an actuation system of the friction clutch and a corresponding detection of the actuation path clearly assigns a pressure provided by the actuation system to the regulated actuation of the friction clutch with non-monotonic characteristic curve along an axial actuation path.

A directional control valve may control hydraulic volume flows to the friction clutch. A pressure sensor in the pressure line between a pressure supply device, for example an electrically operated and controlled pump, and an actuation piston axially actuating a preload spring, such as a diaphragm spring, for setting a preload of the friction clutch in the closed state of the friction clutch provides, in conjunction with a known or continuously recorded history of the friction clutch, the information at which path point of the actuation pressure/actuation path characteristic curve the friction clutch is located. The current actuation path, on which the actuation of the friction clutch is regulated, is derived from the characteristic curve by connecting history and actuation pressure.

Due to leakage, the friction clutch can move in the closing direction without a volume flow set on the directional control valve, so that the direction of movement is known. When a predetermined or specifiable actuation pressure is reached, which certainly corresponds to an actuation path when the friction clutch is still open, a necessary volume of pressure medium for leakage compensation and increasing or maintaining the actuation pressure required for this actuation path is replenished by switching over the directional control valve.

By means of the proposed method and the proposed torque transmission device, rotary feedthroughs of the pressure from a pressure supply device fixed to the housing to the actuating piston rotating with the friction clutch or, in the case of a slave cylinder arranged fixed to the housing with an actuation piston rotationally decoupled with respect to the friction clutch, can be provided with a narrow installation space, since a displacement sensor system requiring a large installation space or arranged fixed to the housing can be dispensed with.

Alternatively, a pressure sensor for detecting the pressure on the actuation piston and optionally a system pressure sensor for detecting the pressure of the pressure supply device can be provided. These can be provided, for example, upstream of the rotary feedthroughs, for example downstream of a directional control valve for controlling or switching an actuation pressure applied to the actuation piston, essentially in a space-neutral manner.

The directional control valve for connecting the actuation piston to the specified actuation pressure can be designed, for example, as a 3/3 directional control valve which, when energized in a first position, connects the pressure line to the friction clutch with the pressure supply device, and, when de-energized, connects the pressure line to the friction clutch with an unpressurized reservoir such as a tank, so that the friction clutch is closed without pressure, and in a middle position seals the pressure line with respect to the reservoir and pressure supply, so that the friction clutch is kept open except for a system-related leakage.

From a combination of the pressure information of the actuation pressure of the pressure line to the friction clutch and the position of the directional control valve, it can be determined, for example, whether the friction clutch is currently being disengaged or engaged. Thus, in conjunction with the history of this information, it can be determined at which actuation path point on the non-monotonic clutch characteristic curve the friction clutch is located at a predetermined actuation pressure. The clutch characteristic curve may be designed in such a way that torque is only transmitted in the monotonically increasing branch of the characteristic curve. The contact point of the friction clutch at which the friction clutch begins to transmit torque, may be between zero and a maximum actuation pressure during actuation paths. From this history, the position of the directional control valve, the pressure information and the characteristic curve, a current actuation path can be deduced for the clutch control, so that a conventional path control system can then be used. In this case, in a subsequent evaluation routine, the actuation travel values recorded and evaluated using the history of the actuation travel are converted into unambiguous actuation travel.

If, for example, starting from an unpressurized initial state with a completely closed friction clutch, the actuation pressure increases at a volume flow into the friction clutch set at the directional control valve, the friction clutch begins the disengagement process, and the actuation path increases. After the maximum force of the clutch characteristic curve has been exceeded, the actuation pressure falls despite an increasing volume supply into the pressure line with an actuation pressure that is lower than the system pressure, while the actuation travel continues to increase. The friction clutch is further disengaged until a path position is reached where the friction clutch is safely open. The directional control valve is then moved to the middle position and no further volume flows into the pressure line to actuate the friction clutch.

Due to various leakage paths, for example on the directional control valve, in the hydraulic line to the friction clutch, the volume enclosed in the pressure line can decrease over time, causing the friction clutch to move towards closing on the characteristic curve and reducing the actuation path. In this case, we are again in a monotonic section of the characteristic curve, the actuating pressure increases with decreasing volume or a decreasing actuation path. As soon as the actuation pressure and thus an actuation path associated with it reaches or exceeds a predetermined threshold when the friction clutch is safely open, for example 1 bar above the end position, volume is supplied again via the directional control valve that is switched open accordingly between the pressure supply device and the pressure line, and the friction clutch is pressed back into its end position.

For targeted closing of the clutch, pressure medium is released from the friction clutch to the tank via the directional control valve. The friction clutch also safely moves towards closing with a reduction in the disengagement distance. This also makes it possible again to clearly detect the current actuation path along the characteristic curve by means of the actuation pressure, in that the previous switching of the directional control valve from the third to the second position is evaluated. Targeted control of a torque that is set as a function of the actuation pressure or of the actuation path set therefrom and transmitted via the friction clutch is possible by appropriate operating pressure specification.

If the history of the actuation pressure and the valve position of the directional control valve is lost, a safe initial state can be established. For this purpose, for example, the directional control valve can be de-energized.

Any second friction clutch that may be present may be designed as a normally open friction clutch. This can be switched to a safe state with an open friction clutch by de-energizing a directional control valve to set an actuation pressure. As a result, a corresponding drive train with two partial transmissions and one friction clutch each connected between the partial transmissions and a drive unit can be transferred to a safe state in which one partial transmission, e.g., the partial transmission with the longer gear and the normally closed friction clutch, can transmit torque, while the other partial transmission transmits no torque when the friction clutch is open and therefore constraints on the drive train can be avoided without overriding the drivability of the motor vehicle.

The threshold for leakage compensation when switching the directional control valve of the normally closed friction clutch may be set taking into account hysteresis in the friction clutch, pressure sensor tolerances, signal noise of the pressure sensor and/or the like. For example, for leakage compensation, provision can be made for dynamically specifying a significant pressure increase in the actuation pressure as a function of the currently applied actuation pressure, which is reached as a minimum at the change from the forward to the reverse characteristic curve. A switch-off threshold of the leakage compensation can also be specified dynamically via a pressure difference when the minimum is reached. As a result, an adaptation of the characteristic curve can be provided.

BRIEF DESCRIPTION OF THE DRAWINGS

The disclosure is explained in more detail with reference to the exemplary embodiment shown in FIGS. 1 to 3. In the figures.

DETAILED DESCRIPTION

Figure 1:
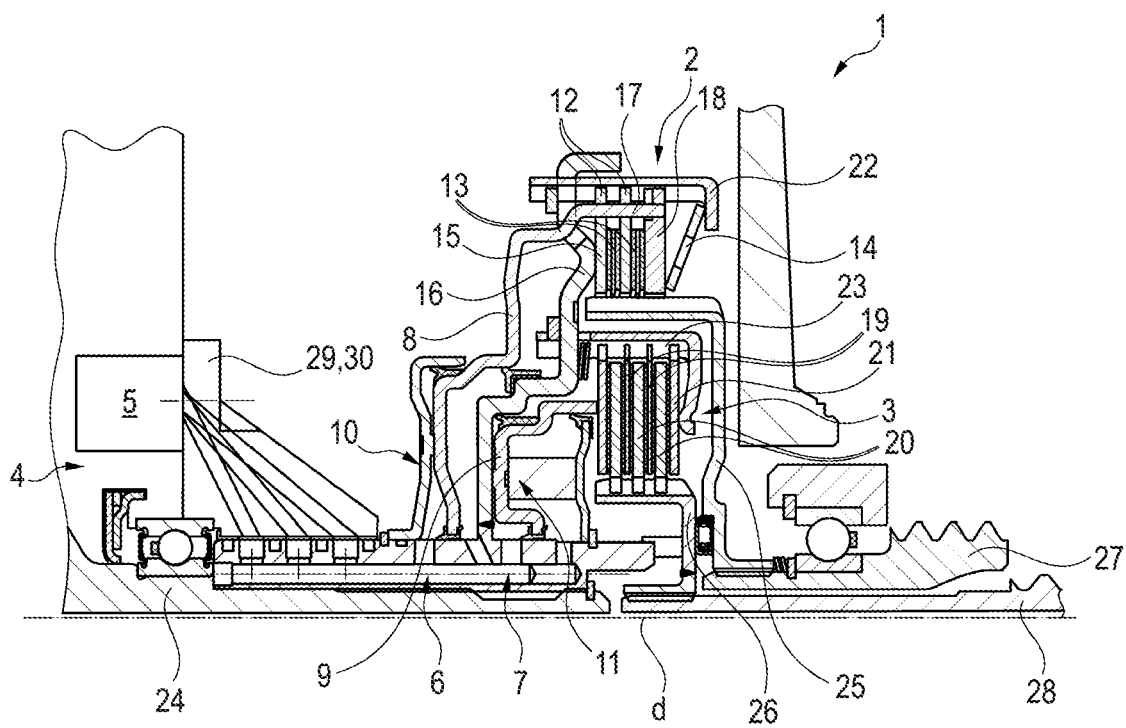
FIG. 1 shows a sectional view of the upper part of a torque transmission device, which is arranged around an axis of rotation.

FIG. 1 shows a sectional view of the upper part of the torque transmission device 1 arranged around the axis of rotation d. The torque transmission device 1 contains the two wet-operated friction clutches 2, 3. The friction clutch 2 is designed as a normally closed friction clutch and the friction clutch 3 is designed as a normally open friction clutch.

The friction clutches 2, 3 are actuated by means of the partially schematically illustrated actuation system 4, which applies an actuation pressure to the pressure lines connected via the rotary bushings 6, 7 by means of the pressure supply device 5, e.g., in the form of an electric pump. As a result, the actuation pistons 8, 9 of the piston-cylinder units 10, 11 are displaced axially.

In the friction clutch 2, which is designed as a normally closed clutch, input-side and output-side plates 12, 13 are axially prestressed against the end plate 15 by means of the disc spring 14. An actuation, i.e., an opening process, of the friction clutch 2 takes place in that the actuation piston 8, by means of axially extended fingers 17 engaging through the carrier part 16 receiving the disc carrier 22, moves the disc 18 opposite the end disc 15 against the action of the plate spring 14 along an axial actuation path by means of the actuation pressure provided by the pressure supply device 5, controlled by the directional control valve 29, shown only schematically, and detected by the pressure sensor 30, also shown only schematically.

The pressing force of the plate spring 14 is not linear and has a maximum and a minimum, so that the actuation path is not proportional to the actuation pressure acting on the actuation piston 8 and, for example, two actuation paths can be assigned to one actuation pressure. A displacement control of the actuation piston 8 based on a predetermined actuation pressure is therefore carried out by evaluating the history of the actuation processes, for example a directional control valve for controlling the friction clutch 2, so that the lack of clarity of the actuation path can be compensated for with this additional information. The procedure for determining the history is shown in detail in FIG. 3.

The friction clutch 3 is designed as a normally open friction clutch, in which there is a clear connection between the actuation pressure and the actuation path. The actuation piston 9 of the piston-cylinder unit 11 prestresses the alternately layered input-side and output-side discs 19, 20 against the axially fixed end disc 21, depending on the actuation pressure.

The disc carriers 22, 23 receiving the input-side discs 12, 19 in a rotationally fixed manner are connected in a rotationally fixed manner to the common input part 24. The input part 24 is connected to a drive unit, not shown, for example an internal combustion engine, an internal combustion engine combined with an electric machine, or an electric machine.

The output-side disc carriers 25, 26, which receive the discs 13, 20 in a rotationally fixed manner, are each connected in a rotationally fixed manner to the transmission input shafts 27, 28 of partial transmissions with at least one transmission ratio. At least one further electric machine can be provided in at least one partial transmission and/or after the partial transmissions. The transmission output shafts of the partial transmissions are connected to drive wheels of a motor vehicle by means of a differential.

If the actuation system 4 fails or is faulty, it is depressurized so that the friction clutch 2 closes or remains closed and the friction clutch 3 opens or remains open. The partial transmission assigned to the friction clutch 2 may have the smaller or longer transmission ratio so that, if the actuation system fails, the speeds of the friction clutches 2, 3 or the transmission with the partial transmissions are not increased. An emergency operation of the motor vehicle is possible with the partial transmission assigned to the friction clutch 2 if the drive unit has an electric machine. Due to the properties thereof, they can be used to start from the state of the motor vehicle without speed compensation.

Figure 2:
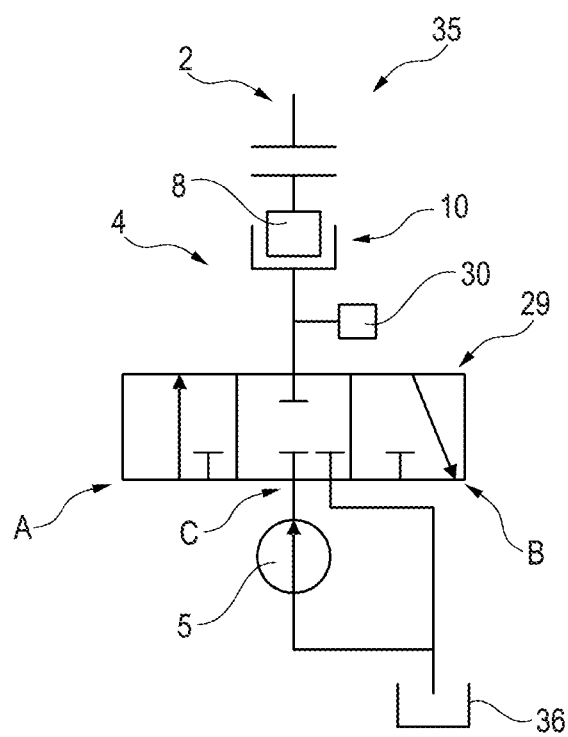
FIG. 2 shows a hydraulic circuit diagram of the actuation system for the normally closed friction clutch of FIG. 1.

FIG. 2 shows the circuit diagram 35 of the actuation system 4 of FIG. 1 for actuating the friction clutch 2 with the directional control valve 29, the pressure supply device 5, the piston-cylinder unit 10 with the actuation piston 8 and the pressure sensor 30. The directional control valve 29 is designed as a 3/3 valve, the position of which is controlled by a control device that controls the actuation system 4. In addition, the actuation pressure applied to the actuation piston is detected by the pressure sensor 30 and transmitted to the control unit. In the control unit, an actuation path S is determined from the position of the directional control valve 29 and the actuation pressure and is compared with a stored characteristic curve of the torque M transmittable via the friction clutch 2 (FIG. 3) over the actuation path S which can be adapted to the current and/or long-term operating situation of the friction clutch and/or the actuation system 4, and from this a current clutch torque transmittable via the friction clutch is determined.

The directional control valve 29 can be switched between the positions A, B, C in an electrically operated manner. The de-energized operation takes place in the second position B, in which the piston-cylinder unit 10 is connected to the unpressurized reservoir 36 and the friction clutch 2 is therefore closed.

In the first position A, the pressure supply device 5 is connected to the piston-cylinder unit 10 and the friction clutch 2 is disengaged, i.e., opened.

In the illustrated position C of the directional control valve 29, the piston-cylinder unit 10 is separated from the pressure supply device 5 and the reservoir. For economical operation of the friction clutch 2 in the open state, position A is then switched to position C in order to keep the friction clutch 2 open without having to operate the pressure supply device 5. The actuation pressure applied is monitored by the pressure sensor 30. If the actuation pressure falls below a specified threshold, it is switched back to position A.

The positions A, B, C of the directional control valve 29 can be used to determine the direction in which the actuation piston 8 is moving. A history of the actuation behavior of the actuation system 4 can be derived from this information. From this, in turn, it can be concluded at which of, for example, two or three path points of the actuation path that can be assigned to the current actuation pressure, the actuation piston 8 is located.

Figure 3:
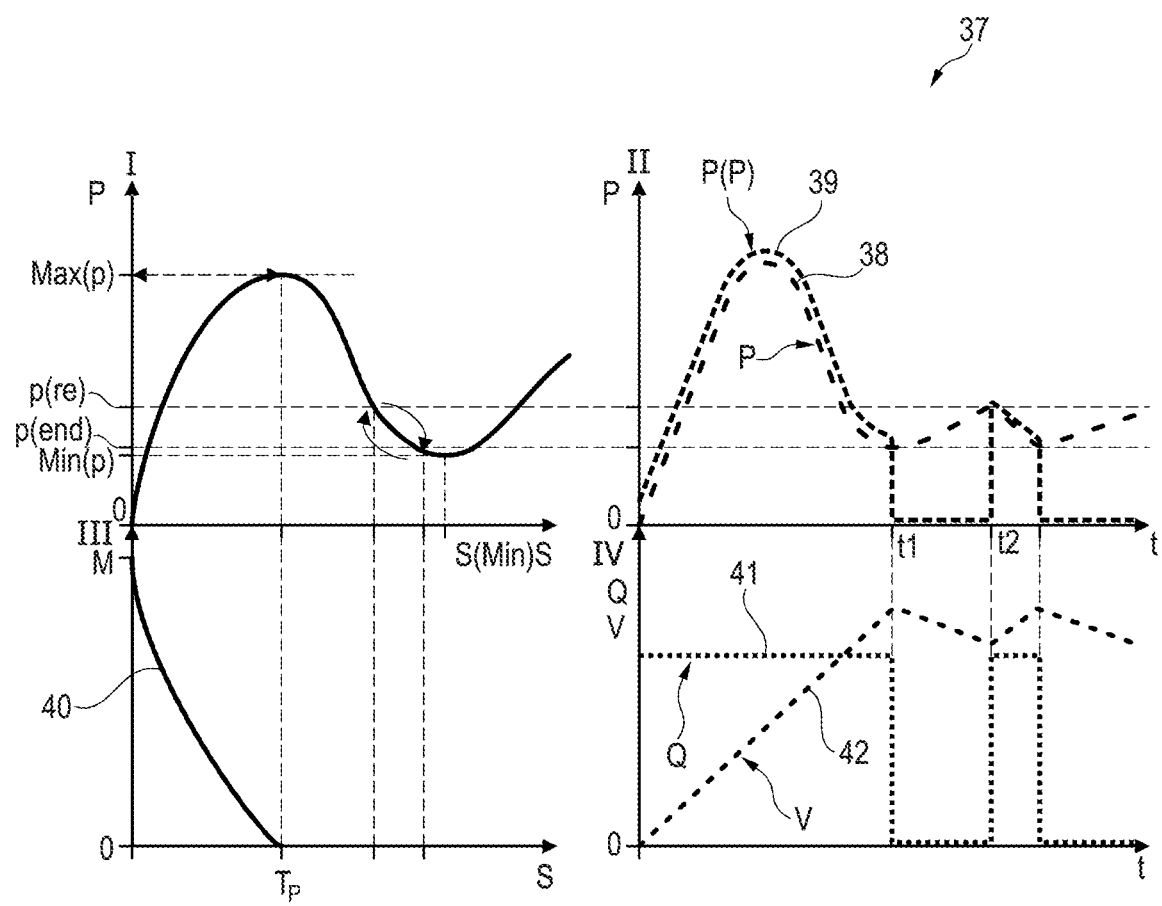
FIG. 3 shows a diagram with partial diagrams to illustrate the function of the actuation system of FIG. 3 for actuating the normally closed friction clutch of the torque transmission device of FIG. 1.

FIG. 3 shows the diagram 37 to illustrate the procedure for clearly assigning the actuation path S to the actuation pressure P. For this purpose, the partial diagram I of FIG. 3 shows the actuation pressure P, which counteracts the characteristic curve of friction clutch 2 to disengage the friction clutch 2. The partial diagram II shows the pressure P over time t with the curve 38 of the actuation pressure P and the curve 39 of the pump pressure P(P) of the pressure supply device 5 of FIGS. 1 and 3. The partial diagram III shows the torque M over the actuation path S with the curve 40 of the torque M that can be transmitted via the friction clutch 2 (FIGS. 1 and 2). The partial diagram IV shows the curves 41, 42 with the volume flow Q of the pressure supply device 5 and the volume V in the hydraulic section of the friction clutch 2 downstream of the directional control valve 29 (FIG. 2) over time t.

With reference to FIGS. 2 and 3, selected operating states of the actuation system 4 and the friction clutch 2 are described below.

According to the partial diagram I, the disengagement process of the friction clutch 2 takes place in position A of the directional control valve 29 on the actuation path at S=0 with increasing actuation pressure P up to the maximum Max(p). Between the actuation path S=0 and the contact point Tp at the maximum Max(p) of the actuation pressure, the friction clutch 2 transmits a torque M that decreases as the actuation path S increases, as shown in curve 40 of the partial diagram II.

In position A, the actuation piston 8 shifts exclusively in the direction of the greater actuation path S so that, with increasing actuation pressure P, a path point can be clearly assigned between the actuation path S=0 and the contact point Tp at the maximum Max(p) of the actuation pressure P. If the actuation pressure P has exceeded the maximum Max(p), the actuation pressure P drops in position A such that a path point of the actuation path S is unambiguously within a path distance between the contact point Tp and the actuation path point S(Min) associated with the minimum Min(p) of the actuation pressure p over the total path distance of the actuation path S. The switch-off threshold p(end) of the fully opened friction clutch 2 is less than the path point s(Min) for actuation paths S.

In positions B, C of the directional control valve 29, the actuation piston 8 shifts exclusively to smaller actuation paths S. If the actuation pressure P is falling, the path point that can be assigned to the actuation pressure P that is clearly at larger actuation paths than the path point s(Min). In all other cases, the path point is clearly located between the contact point Tp and the path point s(Min).

The partial diagram II shows the pressure P over time t. The curve 38 shows the actuation pressure P of the friction clutch 2 and the curve 39 shows the pump pressure P(P) of the pressure supply device 5. The pump pressure P(P) is higher than the actuation pressure P up to the switch-off threshold p(end) at time t1. At time point t1, after the switch-off threshold p(end) has been reached, the directional control valve 29 is switched to position C. As a result of system-related leakage, the actuation pressure P increases again and when the intake threshold p(re) is reached at time point t2, the directional control valve 29 is switched back to position A and the pressure supply device 5 decreases the actuation pressure again to the switch-off threshold p(end). While the friction clutch 2 is maintained in open mode, the friction clutch is continuously maintained between these thresholds.

In the curves 41, 42, partial diagram IV shows the volume flows Q and volumes V associated with the pressures P, P(P) of the pressure supply device 5 and the hydraulic path of the actuation system 4 of the partial diagram II that actuates the friction clutch 2.

REFERENCE NUMERALS

1 Torque transmission device
2 Friction clutch
3 Friction clutch
4 Actuation system
5 Pressure supply device
6 Rotary feedthrough
7 Rotary feedthrough
8 Actuation piston
9 Actuation piston
10 Piston-cylinder unit
11 Piston-cylinder unit
12 Disc
13 Disc
14 Plate spring
15 End disc
16 Carrier part
17 Finger
18 Disc
19 Disc
20 Disc
21 End disc
22 Disc carrier
23 Disc carrier
24 Input part
25 Disc carrier
26 Disc carrier
27 Transmission input shaft
28 Transmission input shaft
29 Directional control valve
30 Pressure sensor
35 Circuit diagram
36 Reservoir
37 Diagram
38 Curve
39 Curve
40 Curve
41 Curve
42 Curve
I Partial diagram
II Partial diagram
III Partial diagram
IV Partial diagram
A Position
B Position
C Position
d Axis of rotation
M Torque
Max(p) Maximum
Min(p) Minimum
P Actuation pressure
p(end) Switch-off threshold
P(P) Pump pressure
p(re) Intake threshold
Q Volume flow
S Actuation path
s(min) Path point
Tp Contact point
t Time
t1 Time point
t2 Time point
V Volume

The invention claimed is:

1. A method for controlling a friction clutch actuated by an actuation system using an actuation pressure ambiguously applied along an actuation path, comprising:
providing the friction clutch and the actuation system;
detecting a time curve of an actuation processes of the friction clutch;
comparing the time curve with the actuation pressure to ascertain an unambiguous friction clutch actuation path;
using the time curve to determine whether the friction clutch is in an opening state or a closing state and whether the actuation pressure is applied to an opened friction clutch actuation path or a closed friction clutch actuation path;
starting from a set actuation pressure, carrying out a directional control of the friction clutch by specifying the actuation pressure;
providing an electrically actuated directional control valve arranged between a pressure supply device and the friction clutch, the electrically actuated directional control valve comprising:
a first position connecting the friction clutch to the pressure supply device for opening the friction clutch;
a second position connecting the friction clutch to an unpressurized reservoir for closing the friction clutch; and
a third position closed relative to the friction clutch, wherein the unambiguous actuation friction clutch path is a function of a position of the electrically actuated directional control valve; and
switching the electrically actuated directional control valve to the first position when the electrically actuated directional control valve is in the third position and the actuation pressure is increasing due to leakage.

2. The method of claim 1 further comprising de-energizing the electrically actuated directional control valve if there is a fault in the actuation system, wherein the electrically actuated directional control valve is set to the second position when it is de-energized.

3. The method of claim 1, further comprising, after switching the electrically actuated directional control valve from the third position to the first position, actuating the pressure supply device to decrease the actuation pressure to a switch-off threshold.

4. The method of claim 1, wherein the electrically actuated directional control valve is switched from the third position to the first position when the actuation pressure reaches an intake threshold.

5. The method of claim 4, further comprising, after switching the electrically actuated directional control valve from the third position to the first position, actuating the pressure supply device to decrease the actuation pressure to a switch-off threshold.

6. The method of claim 5, wherein the switch-off threshold is less than the intake threshold.

7. The method of claim 5, further comprising maintaining the actuation pressure between the intake threshold and the switch-off threshold when the friction clutch is in the opening state.

8. A torque transmission device for controlled transmission of torque from a drive unit to a transmission, wherein:
the drive unit comprises an internal combustion engine or an electric machine;
the transmission comprises a first friction clutch actuated by a hydraulic actuation system with a first ambiguous assignment of a first actuation pressure along a first actuation path;
the hydraulic actuation system comprises:
a pressure supply device for providing the first actuation pressure;
a first pressure sensor for determining the first actuation pressure; and
a control unit comprising a routine for determining a first friction clutch unambiguous actuating path according to the method of claim 1.

9. The torque transmission device of claim 8 wherein the first friction clutch is closed in an unpressurized state.

10. The torque transmission device of claim 9 wherein:
the transmission further comprises a second friction clutch actuated by the hydraulic actuation system with a second ambiguous assignment of a second actuation pressure along a second actuation path;
the second friction clutch is open in an unpressurized state;
the second actuation pressure is provided by the pressure supply device;
the hydraulic actuation system further comprises a second pressure sensor for determining the second actuation pressure;
the routine is also for determining a second friction clutch unambiguous actuating path;
the first friction clutch and the second friction clutch form a double clutch; and
each of the first friction clutch and the second friction clutch is effectively arranged between the drive unit and a respective transmission input shaft of a respective partial transmission with a fixed ratio of the transmission.

11. The torque transmission device of claim 8 wherein:
the hydraulic actuation system further comprises:
an electrically actuated directional control valve arranged between the pressure supply device and the first friction clutch; and
an unpressurized reservoir; and
the electrically actuated directional control valve comprises:
a first position connecting the first friction clutch and the pressure supply device for opening the first friction clutch;
a second position connecting the first friction clutch and the unpressurized reservoir for closing the first friction clutch; and
a third position with the electrically actuated directional control valve closed relative to the first friction clutch.

12. The torque transmission device of claim 11, wherein the electrically actuated directional control valve is switched from the third position to the first position when the actuation pressure reaches an intake threshold.

13. The torque transmission device of claim 12, wherein the control unit comprises a further routine for, after switching the electrically actuated directional control valve from the third position to the first position, actuating the pressure supply device to decrease the actuation pressure to a switch-off threshold.

14. The torque transmission device of claim 13, wherein the switch-off threshold is less than the intake threshold.

15. The torque transmission device of claim 13, wherein the control unit comprises a further routine for maintaining the actuation pressure between the intake threshold and the switch-off threshold when the friction clutch is in the opening state.

16. The torque transmission device of claim 8 wherein:
the friction clutch comprises an axis of rotation;
the pressure supply device is fixed to a housing of the torque transmission device; and
the hydraulic actuation system further comprises:
a piston-cylinder unit, rotatable about the axis of rotation, for operating the friction clutch; and
a rotary feedthrough between the pressure supply device and the piston-cylinder unit.

* * * * *